United States Patent [19]

Zakai

[11] Patent Number: 4,770,201

[45] Date of Patent: Sep. 13, 1988

[54] FLUID FLOW VALVE

[75] Inventor: Avi Zakai, Rishon Le-Zion, Israel

[73] Assignee: Aran Engineering Development Ltd., Meshek, Israel

[21] Appl. No.: 79,707

[22] Filed: Jul. 30, 1987

[30] Foreign Application Priority Data

Aug. 1, 1986 [IL] Israel ................................ 79587

[51] Int. Cl.⁴ ............................................. F16K 31/18
[52] U.S. Cl. ..................................... 137/202; 251/205; 251/901
[58] Field of Search ................ 137/202, 855; 251/205, 251/331, 901

[56] References Cited

U.S. PATENT DOCUMENTS

| | | | |
|---|---|---|---|
| 2,449,573 | 9/1948 | White | 137/855 X |
| 3,282,288 | 11/1966 | Sheppard | 251/901 X |
| 3,951,168 | 4/1976 | Roberts | 251/901 X |
| 3,973,582 | 8/1976 | Siebold | 251/901 X |
| 4,082,106 | 4/1978 | Butcher | 251/901 X |
| 4,084,617 | 4/1978 | Happe | 251/901 X |
| 4,484,728 | 11/1984 | Moore | 251/901 X |

Primary Examiner—A. Michael Chambers
Assistant Examiner—John C. Fox
Attorney, Agent, or Firm—Browdy and Neimark

[57] ABSTRACT

A fluid flow valve such as a faucet or air-purge valve comprising a housing having defined therein a fluid through-flow aperture with a valve seating formed in the housing and bounding said aperture. A flexible closure membrane is secured at one end to the housing and is adapted to be biased, under fluid pressure in the housing, against the valve seating so as to seal the aperture. Membrane displacing means are secured to an opposite end of the membrane so that displacement of the displacing means in a first sense progressively detaches successive transverse portions of the membrane from the seating so as to open the aperture while displacement of the displacing means in an opposite sense allows for the membrane to become sealingly biased against the seating.

8 Claims, 5 Drawing Sheets

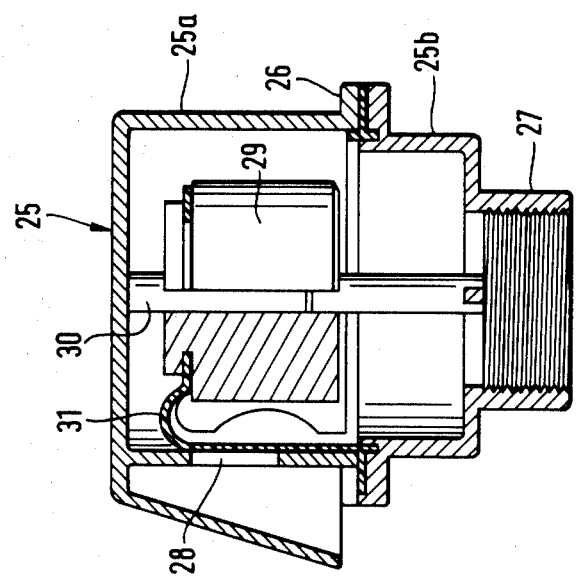
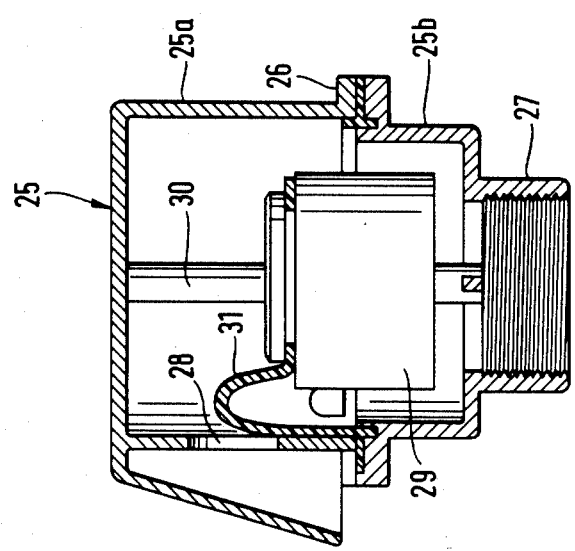

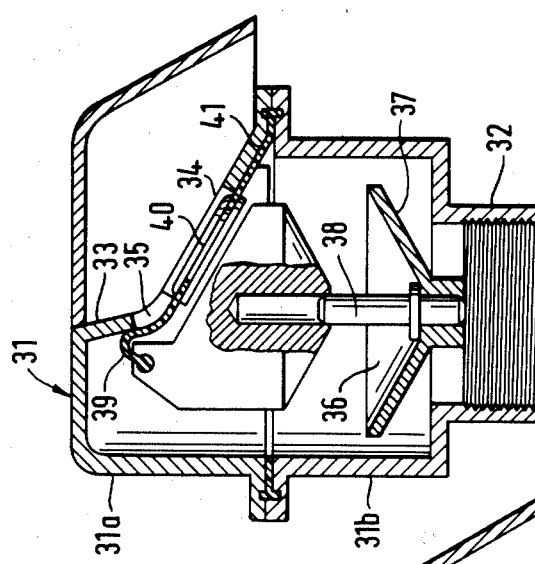
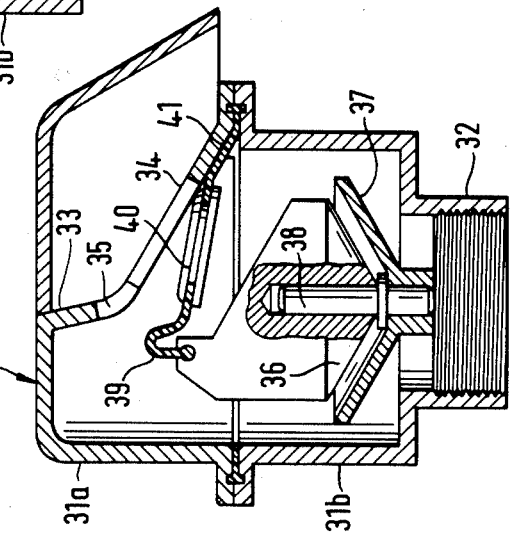
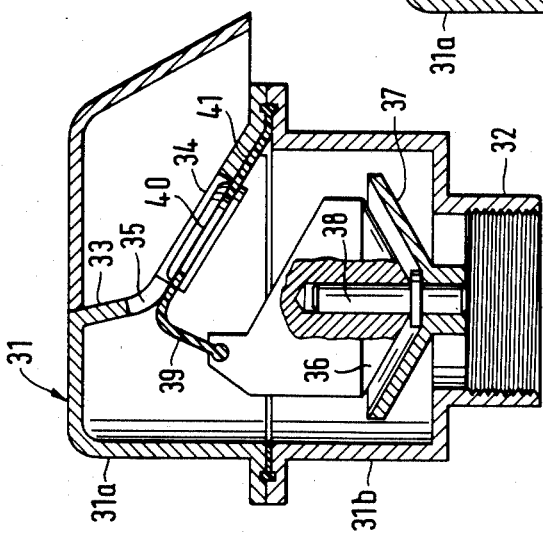
Fig. 4a
Fig. 4b
Fig. 4c

FLUID FLOW VALVE

This invention relates to a fluid flow valve and is particularly but not exclusively concerned with fluid flow valves which are designed to serve as air release or air purge valves.

Such air purge valves are generally fitted to liquid conduits such as, for example, mains distribution lines or sewage distribution conduits and are designed to ensure the release of air or other gases from the conduits, thereby avoiding the production of air locks, for example, which would interfere with the flow of the liquid.

For this purpose, two different kinds of air purge valves are known. In both kinds, a spherical float is located in a housing which is coupled at a lower end thereof to the conduit to be vented and which is provided at its upper end with a venting aperture. In the course of normal operation with the flow of liquid through the conduit, the housing fills with liquid and the spherical float is forced upwardly against the outlet aperture sealing the same. When, however, air accumulates in the conduit, the float is displaced downwardly under its own weight thereby opening the outlet aperture with consequent venting of the air. housing again fills with liquid and the aperture is sealed by the float.

In a first kind of air purge valve, known as the automatic kind, the outlet aperture is of relatively small dimensions and the float is displaced downwardly as soon as any air appears in the housing, thereby allowing for the continuous, automatic venting of the conduit. However, in view of the relatively small dimensions of the aperture, this automatic kind cannot cope with situations wherein large quantities of air have to be vented and where such a situation arises, not all the air is released and some of it passes into the line, causing a build-up of air pressure and ultimately the creation of an air lock.

In order to cope with the situation wherein sudden large quantities of air appear in the line and have to be released, the so-called kinetic valve is used. This valve has a relatively large aperture through which large quantities of air can be rapidly and effectively vented. However, with such a kinetic valve, once the housing thereof has filled with liquid and the float has been pressed against the large aperture so as to seal it, the valve will only reopen once the pressure in the housing has dropped to atmospheric pressure and, in consequence, the kinetic valve cannot be used for the continuous release of small amounts of air.

In view of these limitations on the respective use of the automatic and kinetic valves, composite valves have been designed which effectively consist of a kinetic valve and, superimposed thereon, an automatic valve. With such composite valves, continuous release of relatively small amounts of air throughout operation take place through the automatic valve, whilst sudden bursts of large quantities of air are released through the kinetic valve.

Whilst such composite valves have been used for many years, they are nevertheless of relatively bulky, expensive construction.

It is therefore an object of the present invention to provide a new and improved flow-control valve particularly, but not exclusively, for use as an air purge valve wherein the above referred to disadvantages are substantially reduced or avoided.

According to the present invention, there is provided a fluid flow valve comprising a housing having defined therein a fluid through-flow aperture, a valve seating formed in the housing and bounding the aperture; a flexible closure membrane secured at one end to the housing and being adapted to be biased, under fluid pressure in housing, against the valve seating so as to seal the aperture; and membrane displacing means secured to an opposite end of the membrane; the arrangement being such that the displacement of the displacing means in a first sense progressively detaches successive transverse portions of the membrane from the seating so as to open the aperture whilst displacement of the displacing means in an opposite sense allows for the membrane to become sealingly biased against the seating.

Such a fluid flow valve in accordance with the invention can form the basis of, for example, a manually operable faucet where the membrane displacing means can, for example, be a manually rotatable handle and a screw threaded valve stem secured to the membrane or a pressure control valve where the membrane displaceable means can be a pressure responsive diaphragm or a hydraulic piston.

Preferably, however, and in accordance with an aspect of the present invention, the fluid flow valve in accordance with the present invention is adapted to serve as an air purge valve. In accordance with this preferred aspect of the invention, an air purge valve comprises a housing, a fluid inlet for the housing, an outlet aperture formed in the housing, a valve seating formed in the housing and bounding the outlet aperture, a flexible closure membrane secured at one end to the housing and adapted to be biased, under fluid pressure in the housing, against the valve seating so as to seal the outlet aperture, a float member located in the housing so as to be floatingly displaceable therein between first and second positions respectively adjacent to the fluid inlet and the fluid outlet aperture, and means for coupling the float member to an opposite end of the membrane; the arrangement being such that displacement of the float member from the second to the first position progressively detaches successive transverse portions of the membrane from the seating so as to open the outlet aperture whilst displacement of the float member from the first to the second positions allows for the membrane to become sealingly biased against the seating.

Such an air purge valve in accordance with the present invention can operate in a manner similar to the mode of operation of the known automatic kind of air purge valves as referred to above. However, in view of the fact that the forces to be exerted on the membrane so as to detach it from the valve seating and thereby open the outlet aperture are at each stage limited to the force necessary to detach a single linear transverse portion of the membrane, it is possible, with the construction in accordance with the present invention, to provide for an outlet aperture which is significantly larger than the outlet aperture used with known automatic kind of air purge valves and nevertheless to ensure the automatic opening of the aperture whenever accumulated air is to be released.

In accordance with a preferred embodiment, the air purge valve in accordance with the invention is formed with first and second outlet apertures, the first aperture being substantially less in area than the second aperture, the membrane being secured to the float member adjacent the first aperture so that upon the displacement of the float member from the second to the first position, the membrane is initially detached from the first valve seating. Preferably, the first and second apertures communicate with each other.

For a better understanding of the present invention, and to show how the same may be carried out in practice, reference will now be made to the accompanying drawings in which:

FIGS. 3a and 3b are longitudinally sectioned elevations of a first form of an air purge fluid flow valve in accordance with the present invention in respectively closed and open positions;

FIGS. 4a, 4b and 4c are longitudinally sectioned views of a modified form of air purge fluid flow valve in accordance with the present invention having a pair of outlet apertures and respectively in the closed, partially open and fully open conditions.

Figure 1:
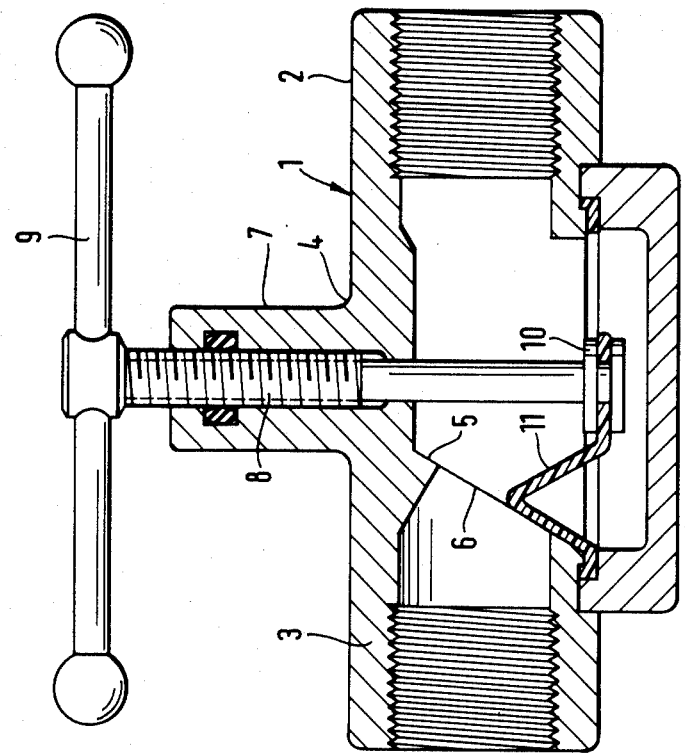
FIG. 1 is a longitudinally sectioned elevation of a fluid flow faucet valve in accordance with the present invention.

Referring to FIG. 1 of the drawings, there is here seen a faucet valve comprising a housing 1 having, at one end, a screw-tapped inlet coupling 2 and, at an opposite end a screw-tapped outlet coupling 3. A central body portion 4 of the housing 1 is formed with an internal valve seating 5 which bounds an outlet aperture 6, the latter being formed with rigid restraining bars (not shown) extending across the aperture from the valve seating.

Projecting from the body portion 4 is a tubular boss 7 having a through-going tapped bore through which extends a correspondingly threaded valve stem 8. The upper end of the valve stem 8 is coupled to a manual turning handle 9 whilst the lowermost end 10 is secured to one end of a flexible membrane 11, the opposite end of which is secured to the housing 1.

As shown in FIG. 1 of the drawings, the faucet valve is open allowing for the through-fluid of liquid from the inner coupling 2 to the outer coupling 3 via the outlet aperture 6. Closure of the valve is effected by rotating the handle 9 so as to displace upwardly the valve stem 8 as a result of which the membrane 11 is progressively straightened allowing for it to be sealingly biased against the valve seating 5. The provision of the restraining bars (not shown) prevents the flexible membrane from bulging through the outlet aperture 6 under the influence of the liquid pressure. With the membrane biased against the valve seating 5, thereby closing the faucet valve, the opening thereof is effected by rotating the handle 9 in an opposite sense leading to the downward displacement of the valve stem 8. The force which has to be exerted so as to open the valve is restricted to the successive detaching of transverse linear portions of the membrane 11 from the valve seating 5 and this allows for the ready opening of a faucet valve despite the fact that the valve may be coupled to a conduit having a relatively high line pressure.

Figure 2:
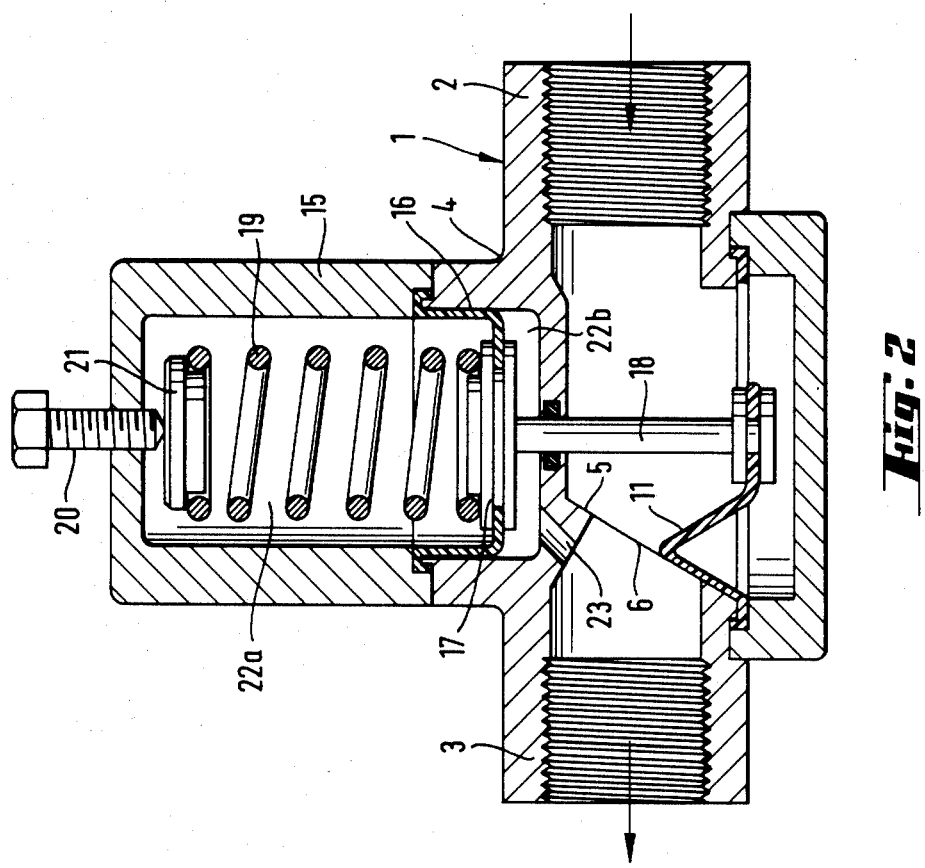
FIG. 2 is a longitudinally sectioned elevation of a fluid flow pressure control valve in accordance with the present invention.

Referring to FIG. 2 of the drawings, there is here shown a pressure control valve which incorporates the essential principles underlying the fluid flow valve in accordance with the present invention. The pressure control valve is provided with a housing 1, inner coupling 2, outer coupling 3, central body portion 4, valve seating 5, outlet aperture 6, and membrane 11, all these elements being identical in construction with the similarly referenced elements described with reference to the faucet valve shown in FIG. 1 of the drawings. In the case of the pressure control valve, however, the central body portion 4 is formed intergrally with a pressure control housing 15 across which extends a flexible diaphragm 16. The latter carries a displacing disc 17 from which extends a valve stem 18 which sealingly passes through the central body portion 4 and is secured at its lower extremity to the membrane 11. The central disc 17 is biased towards the body portion 4 by means of a compression spring 19, the biasing force of which can be adjusted by means of an adjusting screw 20 and bearing member 21. The diaphragm 16 and disc 17 serve to divide the pressure control housing 15 into upper and lower portions 22a and 22b, the portion 22b communicating with the outlet coupling 3 downstream of the outlet aperture 6 via a communicating duct 23.

In operation, variations in the outflowing pressure of the liquid are transmitted via the duct 23 to the housing region 22b resulting in displacements of the diaphragm 16 and disc 17. These displacements are transmitted via the valve stem 18 to the membrane 11, thereby varying the through-flow path through the outlet aperture 6 in accordance with the pressure in the outlet coupling. As explained previously in connection with the faucet valve, the forces required to open the pressure control valve are considerably less than those that would be required with conventional valve closure means. It will be realised that the pressure control diaphragm 16 can be replaced by a pressusre responsive piston.

Reference will now be made to FIGS. 3 of the drawings which illustrate an air purge valve in accordance with the invention. The air purge valve as shown comprises a two-piece housing 25 comprising an upper housing portion 25a and a lower housing portion 25b which are coupled together at their adjoining peripheral flanges 26. The housing portion 25b is formed with an internally threaded inlet coupling 27 whilst the housing portion 25a has formed in one of its walls a slit-like outlet aperture 28. A cylindrical float 29 is located in the housing 25 and is displaceable from an uppermost position shown in FIG. 3a of the drawings to a lowermost position shown in FIG. 3b, the movement of the float being guided by means of a downwardly extending guide rod 30 which passes through the float 29. Secured to the upper end of the float 29 is one end of a flexible membrane 31', the other end of which is secured to the housing 25.

In use and when the housing 25 is full of liquid, the float is located in its uppermost position shown in FIG. 3a of the drawings and the elongated membrane 31' is sealingly pressed against the valve seating constituted by the rim of the slit-like outlet aperture 28. When, however, air enters the housing 25, the float 29 begins to descend and, in its descent, successive linear longitudinal sections of the membrane are successively detached from the valve seating, thereby opening the slit-like outlet aperture 28 for the venting of the air. In view of the fact that the force which has to be exerted to detach successive linear transverse portions of the membrane is substantially less than that which has to be exerted so as to open a conventional air purge valve, the outlet aperture 28 can be of significantly greater size than the corresponding outlet aperture of a normal so-called "automatic" air purge valve and in this way the air purge valve is capable of continuous venting of relatively significant quantities of air.

FIG. 4 of the drawings shows an air purge valve which is provided with a pair of outlet apertures in a manner similar to the composite double outlet aperture valves referred to above so as to enable a single structure valve to operate both as a kinetic and as an automatic air purge valve. As seen in FIG. 4 of the drawings, the air purge valve comprises a housing 31 consisting of an upper housing component 31a and a lower housing component 31b coupled together at adjoining peripheral flanges. The lower housing portion 31b is formed with an inlet coupling 32 whilst a wall 33 of the upper housing portion 31a is formed with a major outlet aperture 34 and, communicating therewith, a slit-like minor outlet aperture 35.

A float 36 is located in the housing 31 and is displaceable from an upper position shown in FIG. 4a of the drawings to a lowermost position shown in FIGS. 4b and 4c, in which lowermost position it rests on a receiving cup 37. The displacement of the float 36 is guided by means of a guide rod 38 which projects upwardly from the receiving cup 37 into a corresponding tubular bore formed in the float 36.

A flexible membrane 39 is secured at one end to the float 36 and at an opposite end to a rigid sealing member 40 which, in its turn, is mounted vis-a-vis the housing by means of a further flexible membrane 41.

As seen in FIG. 4a of the drawings, when the housing 31 is filled with liquid, the float 36 is located in its uppermost position, in which the major aperture 34 is sealed by the rigid sealing member 40 and the minor slit-like aperture 35 is sealed by the flexible membrane 39.

When air enters the system, the float begins to move downwardly and in a process as described above with reference to FIG. 3 of the drawings, the strip-like membrane is progressively detached from the slit-like aperture 35 as shown in FIG. 4b of the drawings, thereby allowing the accumulated air to be vented through the aperture 35. When the pressure in the housing has dropped to atmospheric pressure, the rigid sealing member 40 pivots downwardly under its own weight so as to open the major aperture 34, allowing for the release of any substantial quantity of air which may have become trapped in the housing and which could not be adequately released through the relatively small minor aperture 35.

By virtue of the fact that the small slit-like aperture 35 communicates directly with the large circular aperture 34, it can be ensured that the small aperture 35 does not become blocked by grit or the like and is therefore always available for effective venting of medium quantities of air.

As an alternative to having a rigid sealing member 40 to seal the major aperture 34, an extended unitary membrane can be utilised for this purpose. In order however to ensure that the membrane is not forced through the aperture, the latter can be provided with retaining bars or alternatively the portion of the membrane adjacent the aperture can be made more rigid.

Figure 5:
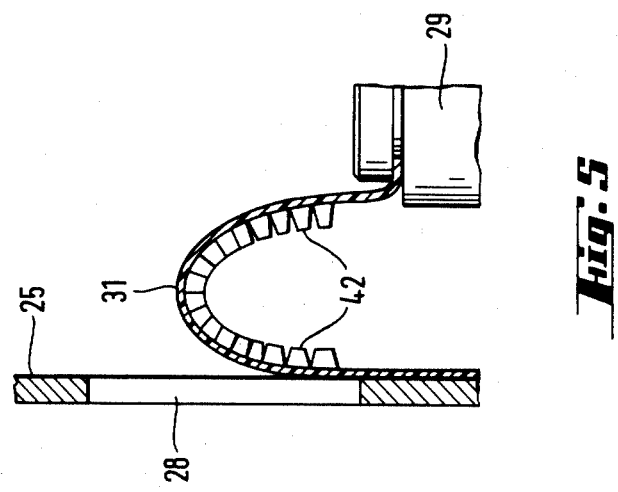
FIG. 5 is a view of a modified detail of the air purge valve shown in FIGS. 3 and 4 of the drawings.

In order to improve the leverage power of the float in ensuring the detaching of the membrane from the valve seating, means can be provided for ensuring that an adequate angle of leverage is maintained. For this purpose the inner surface of the membrane 31' (as shown with reference to FIGS. 3a and 3b of the drawings) can be provided as shown in FIG. 5 of the drawings with inwardly directed projections 42 so that upon bending of the membrane the projections abut one another, thereby preventing the bent over portions of the membrane coming too close together.

I claim:

1. An air purge valve comprising a housing, a fluid inlet for said housing, first and second outlet apertures formed in said housing respectively bounded by first and second valve seatings, said first aperture being of substantially elongated slit like shape, communicating at one end thereof with the second outlet aperture and being substantially less in area than the second aperture; a flexible closure membrane secured at one end to said housing and adapted to be biased, under fluid pressure in said housing, against said valve seatings so as to seal said outlet apertures; a float member located in said housing so as to be floatingly displaceable therein between first and second positions respectively adjacent said fluid inlet and said outlet apertures and means for coupling said float member to an opposite end of said membrane; the arrangement being such that displacement of said float member from said second to first position progressively detaches successive linear transverse portions of said membrane initially from said first valve seating so as to open initially said first outlet aperture and subsequently from said second valve seating so as to open subsequently said second outlet aperture whilst displacement of said float member from said first to said second position allows for said membrane to become sealingly biased against said seatings.

2. An air purge valve according to claim 1 wherein said valve seatings are located substantially transversely to the direction of displacement of said float member.

3. An air purge valve according to claim 1 wherein said valve seatings are located substantially parallel to the direction of displacement of said float member.

4. An air purge valve according to claim 1 wherein a unitary membrane is adapted to bear sealingly against said first and second valve seatings.

5. An air purge valve according to claim 4 wherein that portion of the unitary membrane adapted to bear against said second valve seating is of greater rigidity than the portion adapted to bear against said first valve seating.

6. An air purge valve according to claim 4 wherein said second valve seating is formed with rigid restraining bars extending across said second aperture so as to prevent bulging of the membrane therethrough.

7. An air purge valve according to claim 1 wherein a rigid sealing member is secured to said membrane and is adapted to be sealingly biased against said second valve seating.

8. An air purge valve according to claim 1 wherein said membrane is formed on an inner surface thereof with discrete, integrally formed projections so that uppon said displacement of said float from said second to said first position and a consequent bending over on itself of the membrane, said projections limits the degree to which the bent over portions of the membrane can approach each other.

* * * * *